Sept. 11, 1928.                     1,683,613
C. C. HALLOWELL
ARTIFICIAL TOOTH
Filed March 30, 1926
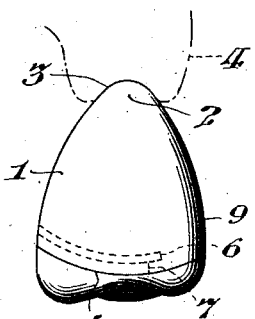
FIG. 1.
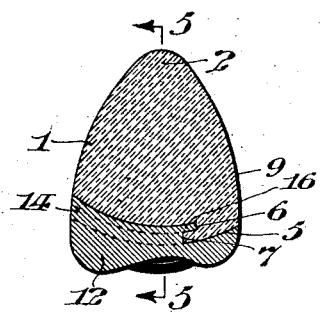
FIG. 2.
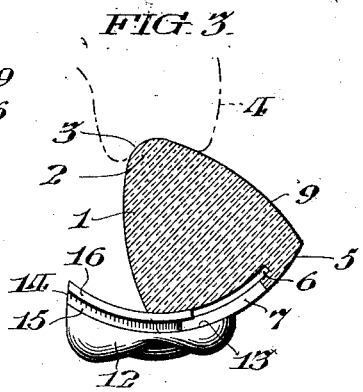
FIG. 3.
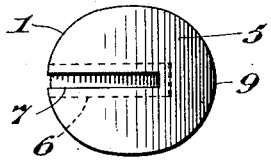
FIG. 4.
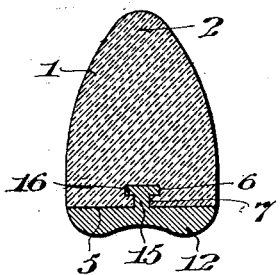
FIG. 5.
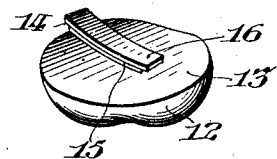
FIG. 6.
FIG. 7.
FIG. 8.
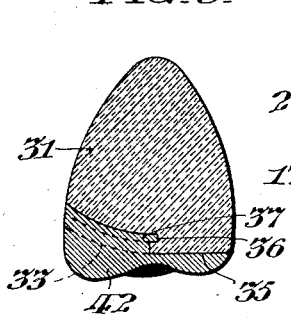
Inventor
Clifton C. Hallowell
By Clifton C. Hallowell
Attorney Patented Sept. 11, 1928.

1,683,613

UNITED STATES PATENT OFFICE.

CLIFTON C. HALLOWELL, OF DREXEL HILL, PENNSYLVANIA, ASSIGNOR TO THE S. S. WHITE DENTAL MANUFACTURING COMPANY, A CORPORATION OF PENNSYLVANIA.

ARTIFICIAL TOOTH.

Application filed March 30, 1926. Serial No. 98,447.

My invention relates particularly to that class of artificial teeth commonly known as pontic teeth, in which the tooth-body is arranged to be supported upon its occlusally disposed end and has its root end extended to engage in the socket from which a natural tooth root has been extracted, for the purpose of preventing or arresting the absorption of the gums, and is especially directed to the form of the occlusally disposed end whereby it is guided into position and retained by its cooperation with the inner face of the cusp structure included in a bridge, or other convenient form of support.

The principal objects of my invention are to provide an artificial tooth with a convexed occlusally disposed end face that may be so cooperative with a correspondingly concaved inner end face of a supporting cusp structure as to effect a rocking motion of the tooth-body when moved into or out of operative position, while its root end is engaged in the gum socket.

Other objects of my invention are to provide an artificial tooth so constructed and arranged as to avoid the formation of sharp or acute angled edges on the porcelain tooth-body, which might tend to be chipped off or be otherwise marred or fractured.

My invention further includes an artificial tooth comprising a tooth-body and a cusp structure, respectively having their opposed end faces provided with interengaging means whereby they may be removably interlocked, when the tooth-body is rocked into operative position with respect to its cusp structure.

Specifically stated, the form of my invention as hereinafter described, comprehends a tooth-body having a root extension preferably terminating in an apex of conoidal formation, and a convexed occlusally disposed end face provided with an undercut recess directed forwardly in parallel relation to said convexed end face, and a cusp structure arranged to support said tooth-body, and having a similarly concaved inner end face conforming to the convexed end face of said tooth-body, and provided with means projecting therefrom, complementary to the undercut recess in said tooth-body, and arranged to so interlock with said recess as to tend to maintain the convexed and concaved end faces respectively of said tooth-body and cusp structure engaged.

My invention also includes all of the various novel features of construction and arrangement as hereinafter more definitely specified.

In the accompanying drawings, Figure 1 is a side elevational view of an artificial tooth constructed in accordance with my invention, and comprises a relatively separable tooth-body and cusp structure; Fig. 2 is a central vertical longitudinal sectional view of the tooth structure shown in Fig. 1; Fig. 3 is a central vertical longitudinal sectional view of the tooth-body in the act of rocking into operative position on the cusp structure, which is shown in elevation for convenience of illustration; Fig. 4 is an inverted plan view of the tooth-body per se; Fig. 5 is a transverse vertical sectional view of the tooth structure shown in Fig. 2, taken on the line 5—5 in said figure; Fig. 6 is a perspective view of the cusp structure per se; Fig. 7 is a perspective view of a piece of bridgework embodying two of the cusp structures shown in Fig. 6 supported by relatively spaced caps carried on natural teeth, forming abutments for the bridge structure; and Fig. 8 is a central vertical longitudinal sectional view of a slightly modified form of my invention.

In said figures, the tooth-body 1 has the apical root extension 2 arranged to be extended into the root socket 3 of the gum ridge 4, which is shown in dot-and-dash lines in Figs. 1 and 3. The tooth-body 1 has the occlusally disposed convexed end face 5, which is provided with an undercut recess 6, opening through the slot 7 in said convexed occlusally disposed end face 5.

As best shown in Fig. 3, the recess 6 is curved parallel with the curve of the occlusally disposed end face 5, and extends toward the outer lateral face 9 of the tooth-body 1, but terminates within said tooth-body, the occlusally disposed end face 5, and the recess 6, being preferably curved about the apical root extension 2, as a center.

The tooth-body 1 is arranged to be supported by the cusp structure 12 having its inner end face 13 concaved to conform to the occlusally disposed convexed end face 5 of said tooth-body 1. Said cusp structure 12 is provided on the said concaved end face 13, with an overhanging projection 14, complementary to the recess 6 and slot 7 in the tooth-body 1, and comprising the web 15 and flanged head 16 extending parallel with the face 13, said web 15 being arranged to enter the slot 7 and the head 16 to enter the recess 6 in the tooth-body 1, so as to interlock therewith and rigidly engage the tooth-body 1 in interlocked engagement with the cusp structure 12.

The cusp structure 12 may be supported in any suitable manner to afford a mounting for the tooth-body 1, such, for instance, as shown in Fig. 7, wherein two of the cusp structures 12 are disposed side by side between the caps 17 and 18, to which they are soldered to form an integral bridge structure, said caps 17 and 18 being carried by natural tooth root abutments 20 and 21 respectively.

It may be here noted that by reason of the fact that the recess 6 in the tooth-body 1 and the head 16 on the cusp structure 12 are parallel with the end faces 5 and 13 respectively, and therefore are similarly curved with respect to said faces, the tooth-body 1 may be rocked into its operative position on the cusp structure 12 by sliding the face 5 upon the face 13, as shown in Fig. 3, until the tooth-body 1 registers with the cusp structure 12, as shown in Figs. 1 and 2.

In the form of my invention shown in Fig. 8, the tooth-body 31 has its occlusally disposed end face formed of the convexed surface 33 merging forwardly into the plane substantially horizontal surface 35, and having the undercut recess 36 arranged to receive projection 37 on the inner end face comprising the correspondingly concaved and plane surfaces forming the complementary adjacent face of the cusp structure 42. By extending the occlusally directed face of the tooth-body forwardly in a plane the metal of which the cusp structure is formed, that will be visible from the front of the tooth, may be greatly reduced.

My invention is advantageous in that by forming the occlusally disposed surface of the tooth-body 1 convexed, and the inner surface of the cusp structure 12 correspondingly concaved, the apical root extension 2 may be first inserted into the extracted tooth socket and the tooth-body rocked into place about an axis so disposed that said apical root extension will rotate in said socket.

I do not desire to limit my invention to the precise details of construction and arrangement as herein set forth, as it is obvious that various modifications may be made therein without departing from the essential features of my invention as defined in the appended claims.

Having thus described my invention, I claim:

1. An artificial tooth comprising a tooth-body and a cusp structure arranged to support said tooth-body, each having opposed faces constructed and arranged to permit the tooth-body to be rocked into operative position upon the cusp structure, while the root end of the tooth-body is rotatably engaged in the gum socket and the cusp structure is rigidly supported in spaced relation to said gum socket, and each having means in their opposed surfaces complementary to guide said opposed surfaces in slidable relation into registry, and to interlock said tooth-body and cusp structure together.

2. An artificial tooth comprising a tooth-body having a root extension, and a convexed occlusally disposed end face provided with a recess directed forwardly in parallel relation with said convexed end face.

3. An artificial tooth comprising a tooth-body having a root extension, and a convexed occlusally disposed end face provided with a recess directed forwardly in parallel relation with said convexed end face, and a cusp structure having a similarly concaved inner end face conforming to said convexed end face and provided with means arranged to interengage said recess.

4. An artificial tooth comprising a tooth-body having a root extension, and a convexed occlusally disposed end face provided with a recess extending forwardly in parallel relation with said end face, and terminating short of the outer lateral face of said tooth-body, and a cusp structure having a similarly concaved inner end face conforming to said convexed face, and provided with an overhanging projection arranged to cooperate with said recess to engage said tooth-body and cusp in interlocked relation.

5. An artificial tooth comprising a tooth-body having a root extension terminating in a conoidal apex, and having its convexed occlusally disposed end face provided with a recess directed forwardly in parallel relation with said end face, and a cusp structure having a similarly concaved inner end face conforming to the convexed end face of said tooth-body, and having a headed projection complementary to the undercut recess in said tooth-body, and arranged to effect a sliding relation between said convexed and concaved surfaces and to afford an interlocking engagement between said tooth-body and cusp structure.

6. An artificial tooth comprising a tooth-body having a root extension forming a conoidal apex and a convexed occlusally disposed end face curving about said apex as a center, and having an undercut recess therein curved in parallel relation therewith, and terminating short of the outer lateral face of said tooth-body and a cusp structure having a concaved inner end face slidably conforming to the convexed end face of said tooth-body and having a headed projection complementary to said undercut recess and cooperative therewith to guide said tooth-body into registry with said cusp structure and to retain it thus engaged.

7. An artificial tooth comprising a tooth-body having a root extension, and a convexed occlusally disposed end face provided with an undercut recess extending parallel with said convexed end face.

8. An artificial tooth comprising a cusp structure having its inner face concaved and provided with a relatively parallel overhanging projection with which a tooth-body may be engaged in interlocked relation.

9. An artificial tooth comprising a tooth-body and a cusp structure, the tooth-body having a root extension and a convexedly curved occlusally disposed end surface, said cusp structure having a complementary curved end surface, said tooth-body and cusp structure having opposed means distinct from the opposed curved surfaces of said tooth-body and said cusp structure, constructed and arranged to guide the tooth-body and cause it to rock into operative position with the cusp structure while the root extension is substantially rotatably engaged in the gum socket and said opposed curved end surfaces are maintained in slidable relation.

In witness whereof, I have hereunto set my hand this twenty-ninth day of March, A. D., 1926.

CLIFTON C. HALLOWELL.